(12) United States Patent
Ratnakar et al.

(10) Patent No.: US 9,363,072 B2
(45) Date of Patent: Jun. 7, 2016

(54) COMPUTING SYSTEM WITH SYNCHRONIZATION MECHANISM AND METHOD OF OPERATION THEREOF

(71) Applicant: Samsung Electronics Co., Ltd., Suwon-si, Gyeonggi-Do (KR)

(72) Inventors: Niranjan N. Ratnakar, San Diego, CA (US); Tiangao Gou, San Diego, CA (US); Pranav Dayal, San Diego, CA (US); Jungwon Lee, San Diego, CA (US); Hyunseok Ryu, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/537,017

(22) Filed: Nov. 10, 2014

(65) Prior Publication Data

US 2015/0341164 A1 Nov. 26, 2015

Related U.S. Application Data

(60) Provisional application No. 62/001,961, filed on May 22, 2014, provisional application No. 62/034,933, filed on Aug. 8, 2014.

(51) Int. Cl.
*H04L 7/04* (2006.01)
*H04W 56/00* (2009.01)

(52) U.S. Cl.
CPC .............. *H04L 7/04* (2013.01); *H04W 56/001* (2013.01); *H04W 56/002* (2013.01)

(58) Field of Classification Search
CPC ..... H04W 56/00; H04W 56/01; H04W 56/02; H04L 7/00; H04L 7/04
See application file for complete search history.

(56) References Cited

U.S. PATENT DOCUMENTS

| 6,549,592 | B1* | 4/2003 | Jones ............................ 375/354 |
| 8,737,276 | B2 | 5/2014 | Madan et al. |
| 2006/0146869 | A1* | 7/2006 | Zhang ................... H04W 28/20 370/465 |
| 2013/0201967 | A1* | 8/2013 | Nentwig ....................... 370/336 |
| 2013/0242974 | A1* | 9/2013 | Li ................................. 370/350 |
| 2013/0279448 | A1* | 10/2013 | Kim et al. ..................... 370/329 |
| 2013/0315152 | A1 | 11/2013 | Ratasuk et al. |
| 2014/0050246 | A1* | 2/2014 | Kwon et al. .................... 374/29 |
| 2014/0064263 | A1 | 3/2014 | Cheng et al. |
| 2015/0043545 | A1* | 2/2015 | Cheng et al. ................. 370/336 |

FOREIGN PATENT DOCUMENTS

| CN | 101388871 B | * 10/2012 |
| WO | 2013173992 A1 | 11/2013 |

* cited by examiner

*Primary Examiner* — Jean B Corrielus
(74) *Attorney, Agent, or Firm* — IP Investment Law Group

(57) ABSTRACT

A computing system includes: a communication unit configured to: identify a first synchronization symbol and a second synchronization symbol corresponding to a synchronization signal, generate the synchronization signal including the first synchronization symbol and the second synchronization symbol using a synchronization generator mechanism and a prefix generator mechanism; and an inter-device interface coupled to the communication unit, configured to communicate the synchronization signal for synchronizing a first device and a second device for communicating a serving content.

17 Claims, 5 Drawing Sheets

COMPUTING SYSTEM WITH SYNCHRONIZATION MECHANISM AND METHOD OF OPERATION THEREOF

CROSS-REFERENCE TO RELATED APPLICATION(S)

This application claims the benefit of U.S. Provisional Patent Application Ser. No. 62/001,961 filed May 22, 2014 and Provisional Patent Application Ser. No. 62/034,933 filed Aug. 8, 2014 and the subject matter thereof is incorporated herein by reference thereto.

TECHNICAL FIELD

An embodiment described herein relates generally to a computing system, and more particularly to a system with synchronization mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with synchronization mechanism. In view of the ever-increasing commercial competitive pressures, along with growing consumer expectations and the diminishing opportunities for meaningful product differentiation in the marketplace, addressing such issues are becoming increasingly valuable. Additionally, the need to reduce costs, improve efficiencies and performance, and meet competitive pressures adds an even greater urgency for finding answers to these problems.

Solutions to these problems have been long sought but prior developments have not taught or suggested any solutions and, thus, solutions to these problems have long eluded those skilled in the art.

SUMMARY

An embodiment described herein provides a computing system, including: a communication unit configured to: identify a first synchronization symbol and a second synchronization symbol corresponding to a synchronization signal, generate the synchronization signal including the first synchronization symbol and the second synchronization symbol using a synchronization generator mechanism and a prefix generator mechanism; and an inter-device interface coupled to the communication unit, configured to communicate the synchronization signal for synchronizing a first device and a second device for communicating a serving content.

An embodiment described herein provides a method of operation of a computing system including: identifying a first synchronization symbol and a second synchronization symbol corresponding to a synchronization signal; generating with a communication unit the synchronization signal including the first synchronization symbol and the second synchronization symbol using a synchronization generator mechanism and a prefix generator mechanism; and communicating the synchronization signal for synchronizing a first device and a second device for communicating a serving content.

An embodiment described herein provides a non-transitory computer readable medium including instructions for operating a computing system including: identifying a first synchronization symbol and a second synchronization symbol corresponding to a synchronization signal; generating with a communication unit the synchronization signal including the first synchronization symbol and the second synchronization symbol using a synchronization generator mechanism and a prefix generator mechanism; and communicating the synchronization signal for synchronizing a first device and a second device for communicating a serving content.

Certain embodiments have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
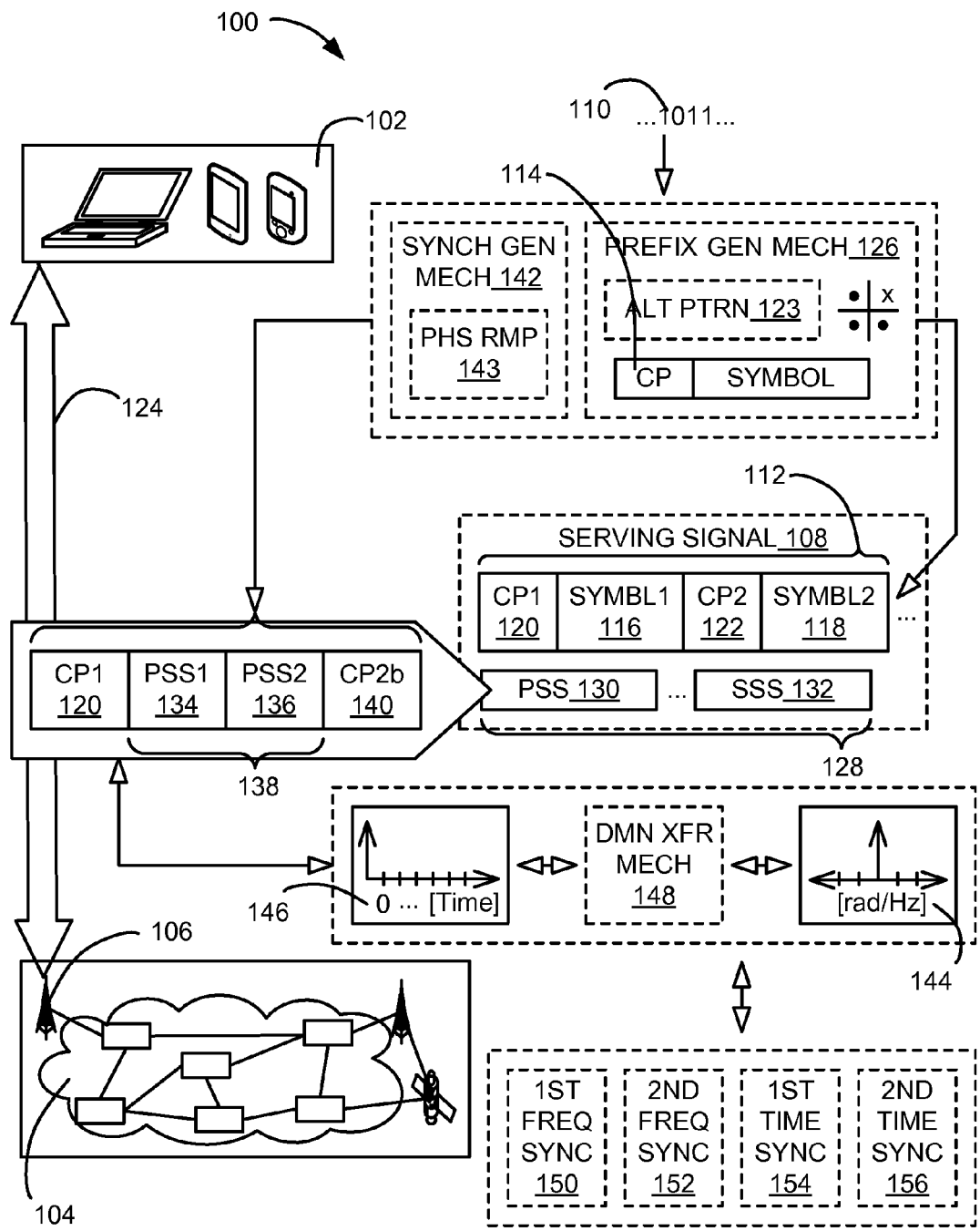
FIG. 1 is a computing system with synchronization mechanism in an embodiment.

The following embodiments can be used to generate a synchronization signal, including a first synchronization symbol and a second synchronization symbol consecutively according to synchronization adjacency structure, using a prefix generator mechanism originally intended or designed to implement an alternating pattern. Adjustments or corrections can be made using synchronization generator mechanism to generate the synchronization signal using the prefix generator mechanism.

The interference-based feedback mechanism can be used to respond to processing receiver signal. Receiving device can utilize an interference-aware receiver to calculate the interference link metric, the serving link metric, or a combination thereof based on processing the receiver signal.

The receiving device can further utilize the interference-aware receiver to determine the interference communication scheme. The receiving device can use the interference link metric, the serving link metric, the interference communication scheme, or a combination thereof as input for the interference-based feedback mechanism to determine the channel feedback information or the serving communication scheme. The determined instance of the channel feedback information or the serving communication scheme can be appropriate for establishing or producing the target rate in communicating serving content within the communication environment.

The following embodiments are described in sufficient detail to enable those skilled in the art to make and use the embodiments described herein. It is to be understood that other embodiments would be evident based on the present disclosure, and that system, process, or mechanical changes may be made without departing from the scope of an embodiment.

In the following description, numerous specific details are given to provide a thorough understanding of an embodiment. However, it will be apparent that an embodiment may be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for an embodiment.

The term "module" referred to herein can include or be implemented as software, hardware, or a combination thereof in an embodiment described herein in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with synchronization mechanism in an embodiment of the present invention. The computing system 100 can include a first device, such as a user electronic device 102, connected to a network 104. The user electronic device 102 can include a portable or mobile device, a stationary device, a consumer device, a host device, or a combination thereof.

For example, the user electronic device 102 can include a mobile phone, a smart phone, a wearable device, an implanted device, a laptop or tablet computer, a vehicle, a portion therein, or a combination thereof. Also for example, the user electronic device 102 can include a router, a server, an object or an article including Internet of Things (IoT) capability or feature therein, a desktop computer, a portion therein, or a combination thereof.

Also for example, the user electronic device 102 can include a circuit or a device within a comprehensive device, such as a portion or circuit specializing in processing information within a storage device or system. Also for example, the user electronic device 102 can include user equipment (UE).

The network 104 is a system of wired or wireless communication devices or means that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks, for a wireless cellular network, or a combination thereof. Also for example, the network 104 can include a communication bus, a wire, a cable, a wireless connection, or a combination thereof between units within a device.

The user electronic device 102 can communicate with or through the network 104. The user electronic device 102 can further communicate with a further instance of the user electronic device 102. The user electronic device 102 can communicate with the further instance of the user electronic device 102 either directly or through the network 104.

The computing system 100 can include a second device, such as an access node 106, for directly or indirectly linking and communicating with the user electronic device 102. The network 104 can include the access node 106. The access node 106 can receive wireless or wired communication signals from the user electronic device 102, transmit signals to the user electronic device 102, process signals, or a combination thereof. The access node 106 can also relay signals between other instances of the access node 106, components within the network 104, or a combination thereof.

The user electronic device 102 can be connected to the network 104 through the access node 106. The access node 106 can sending signal to, receiving signals from, or a combination thereof in communicating and connecting the user electronic device 102.

For example, the access node 106 can include a router, a server, a gateway, a modem, a base station, a cell tower, a wireless router, an antenna, a portion therein, or a combination thereof. Also for example, the access node 106 can include a user device or a mobile device acting as a base station, an access point, a hub, a hotspot, a tethering point, a peer-to-peer network component, or a combination thereof. Also for example, the access node 106 can include an evolved node B (eNodeB) as an element in an air interface representing evolved UMTS terrestrial radio access (e-UTRA).

Also for example, the access node 106 can be a communication device or a processing component included or with a cell tower, a wireless router, an antenna, or a combination thereof being used to communicate with, such as by sending signals to or receiving signals from, the user electronic device 102 including a mobile computing device. Also for example, the access node 106 can include a portion or circuit specializing in storing information within the storage device or system.

The access node 106 can be used to wirelessly exchange signals representing content for communication, including voice or sounds of a telephone call or data representing a webpage, text, a picture, an instruction, an interaction therewith, a control parameter, or a combination thereof. The access node 106 can also transmit reference signals, training signals, error detection signals, error correction signals, header information, transmission format, protocol information, or a combination thereof for enabling the communication of the content.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The access node 106 and the user electronic device 102 can communicate serving signal 108 including or corresponding to serving content 110 intended for each other. The serving content 108 can include data from a transmitting device intended for communication by reproduction or processing at a receiving device. For example, the serving content 108 can be a sequence of bits intended for displaying, audibly recreating, executing instructions, storing, or a combination thereof at a particular receiving device, such as an instance of the user electronic device 102.

The access node 106, the user electronic device 102, or a combination thereof can generate the serving signal 108 based on the serving content 110. For example, the serving signal 108 can be generated by coding the serving content 110, such as according to turbo coding mechanism or polar coding mechanism. Also for example, the serving signal 108 can be generated as one or more symbols representing the serving content 110 according to a modulation constellation or scheme, a modulation-coding scheme (MCS), or a combination thereof. Also for example, the serving signal 108 can be generated based on adding information, such as reference portion or header portion, rearranging the serving content 110, such as for interleaving or separating into multiple segments, or a combination thereof.

The serving signal 108 can include one or a sequence of symbols. Each of the symbols can be a specific phase, magnitude, frequency, or a combination thereof in electro-magnetic force or energy for representing specific information, such as a specific value or a specific sequence of values. The symbols can be according to the modulation constellation, the MCS, communication protocol, or a combination thereof. The symbols can be represented as a complex number.

The serving signal 108 can further include message segments 112. The message segments 112 can include a unit or a regular portion designated to contain specified amount of information. For example, the message segments 112 can be slots each dedicated to include a combination of the intended data of a designated length and corresponding header or error-related information. As a more specific example, each of the message segments 112 can include one instance of the symbol and corresponding prefix portion 114.

The prefix portion 114 can include values inserted according to each instance of the symbol for guarding intervals and for allowing processing of the serving signal 108. The prefix portion 114 can be for eliminating inter-symbol interference from each instance of the corresponding symbol. The prefix portion 114 can further include repetition of a portion of a symbol or inserted values for allowing frequency-based processing, such as using linear convolution, circular convolution, Fourier transform, or a combination thereof. The prefix portion 114 can include cyclic prefix (CP).

Continuing with the more specific example, two consecutive or adjacent instances of the message segments 112 can include a first symbol 116, a first prefix 120 corresponding to the first symbol 116, a second symbol 118, a second prefix 122 corresponding to the second symbol 118, or a combination thereof. The first instance of the message segments 112 can include the first symbol 116 and the first prefix 120. The second instance of the message segments 112 can include the second symbol 118 and the second prefix 122.

The computing system 100 can use a prefix generator mechanism 126 to process the serving content 110 in generating the serving signal 108. The prefix generator mechanism 126 is a method or a process for generating the prefix portion 114 for each instance of the symbols. For example, the prefix generator mechanism 126 can generate the first prefix 120 based on the first symbol 116, generate the second prefix 122 based on the second symbol 118, or a combination thereof.

The prefix generator mechanism 126 can further generate the message segments 112. The prefix generator mechanism 126 can fill or populate the message segments 112 with the symbol and the prefix portion 114. For example, the prefix generator mechanism 126 can receive or generate sequence of symbols corresponding to the serving content 110, such as the first symbol 116 and the second symbol 118. The prefix generator mechanism 126 can generate the prefix portion 114 and combine with the sequence of symbols to generate the message segments 112.

The prefix generator mechanism 126 can generate the message segments 112 according to an order, a sequence, an arrangement, or a combination thereof for the symbols and the prefix portion 114 as predetermined by the computing system 100, communication protocol or standard, or a combination thereof. For example, the prefix generator mechanism 126 can generate the message segments 112 including the symbol before or after the prefix portion 114.

As a more specific example, the first symbol 116 can be before or after the first prefix 120 in first instance of the message segments 112. The prefix generator mechanism 126 can maintain the same order, sequence, arrangement, or a combination thereof for subsequent instances of the message segments 112, such as for the second symbol 118 and the second prefix 122.

The prefix generator mechanism 126 can generate the message segments 112 including an alternating pattern 123 between the symbol and the prefix portion 114. For example, the prefix generator mechanism 126 can generate the message segments 112 to include the first symbol 116, the first prefix 120, the second symbol 118, and the second prefix 122 in such order or sequence. Also for example, the prefix generator mechanism 126 can generate the message segments 112 to include the first prefix 120, the first symbol 116, the second prefix 122, and the second symbol 118 in such order or sequence.

Also for example, the symbol, the prefix portion 114, or a combination thereof for each instance of the message segments 112 can be represented as:

$$s(t)=\sum_{k=-31}^{-1} a_k e^{j2\pi\Delta fk(t-N_{cp}T_s)}+\sum_{k=1}^{31} a_k e^{j2\pi\Delta fk(t-N_{cp}T_s)},$$
$$0 \leq t < (N+N_{cp})T_s. \quad \text{Equation (1)}.$$

As a more specific example, Equation (1) can represent the second symbol 118 and the second prefix 122. The term '$a_k$' can represent the frequency components or representation of the second symbol 118. The term 's(t)' can represent a time continuous signal, such as a portion within the serving signal 108, corresponding to the symbol representing the serving content 110 or a portion therein.

The prefix generator mechanism 126 can include the prefix generator mechanism 126 for intended or originally designed for inter-node communication 124. The inter-node communication 124 can include exchange of information between the user electronic device 102 and the access node 106.

The inter-node communication 124 can include communication of the serving content 110 between instances of the user electronic device 102 through or using one or more instances of the access node 106, the network 104, or a combination thereof. For example, the inter-node communication 124 can include one instance of the user electronic device 102 transmitting the serving signal 108 to one instance of the access node 106, the one instance of the access node 106 exchanging the serving signal 108 or the serving content 110 with a further instance of the access node 106, the further instance of the access node 106 transmitting the serving signal 108 or the serving content 110 to an intended recipient instance of the user electronic device 102, or a combination of processes thereof.

The prefix generator mechanism 126 can include a device, a method, a process, a portion therein, or a combination thereof designed or intended for use in the inter-node communication 124, such as for 3G, LTE, or 4G communications. The prefix generator mechanism 126 can include a device, a method, a process, a portion therein, or a combination thereof designed or intended to generate the alternating pattern 123 for alternating an instance of the symbol and an instance of the prefix portion 114 in the message segments 112.

The computing system can further generate and communicate a synchronization signal 128. The synchronization signal 128 can include information, stimulus, a pattern thereof, or a sequence thereof, or a combination thereof intended for operating multiple device in unison. The synchronization signal 128 can align or coincide timing, an operation, a process, a cycle, a clock, or a combination thereof between devices in the computing system 100 that are otherwise operating independently and utilizing independent timing, operation, processes, or a combination thereof.

The synchronization signal 128 can include a primary synchronization 130, such as a primary synchronization signal (PSS), a secondary synchronization 132, such as a secondary synchronization signal (SSS), or a combination thereof. The primary synchronization 130 can occur before or after in time, above or below in frequency, using a relative phase offset, or a combination thereof in relation to the secondary synchronization 132.

The synchronization signal 128, such as including the primary synchronization 130, the secondary synchronization 132, or a combination thereof can include a specific or a predetermined content, format, timing, sequence, pattern, structure, characteristics, physical trait, or a combination thereof. For example, the synchronization signal 128 can include a first synchronization symbol 134, a second synchronization symbol 136, a synchronization adjacency structure 138, or a combination thereof.

The first synchronization symbol 134 and the second synchronization symbol 136 are symbols designated for the synchronization signal 128. The first synchronization symbol 134, the second synchronization symbol 136, or a combination thereof can include specific instance or value of the symbol, the modulation constellation or scheme, or a combination thereof predetermined for the synchronization signal 128 by the computing system 100, the communication protocol or standard, or a combination thereof. The first synchronization symbol 134 and the second synchronization symbol 136 can be same instance of the symbol transmitted at separate transmission occasions or opportunities, such as for slots, times, frequencies, phases, or a combination thereof.

The synchronization adjacency structure 138 is a condition or a situation where two symbols are abutting each other, back-to-back to each other, sharing a boundary with each other, or a combination thereof. For example, the synchronization adjacency structure 138 can be a requirement for the synchronization signal 128 to include the first synchronization symbol 134 and the second synchronization symbol 136 abutting each other in the transmission occasions or opportunities, including slots, times, frequencies, phases, or a combination thereof.

As a more specific example, the synchronization adjacency structure 138 can be a requirement for not including any instance of the prefix portion 114 and not any other information between one instance of the first synchronization symbol 134 and a subsequent instance of the second synchronization symbol 136. The original intent or design of the prefix generator mechanism 126 for generating the alternating pattern 123 of the prefix portion 114 and the symbol can be incompatible for the synchronization adjacency structure 138 in generating the synchronization signal 128.

The synchronization signal 128 can further include a prefix remainder 140. The prefix remainder 140 can include a byproduct of switching locations between the symbol and the prefix portion 114 to generate the synchronization adjacency structure 138. The prefix remainder 140 can include information following or associated with the second synchronization symbol 136.

For example, the prefix remainder 140 can be associated with the second synchronization symbol 136, the second prefix 122, or a combination thereof. As a more specific example, the prefix remainder 140 can include a length similar to or associated with the second prefix 122. Also as a more specific example, the prefix remainder 140 can include content or value similar to or associated with the second prefix 122.

The computing system 100 can use the prefix generator mechanism 126 and a synchronization generator mechanism 142 to generate the synchronization signal 128 including the synchronization adjacency structure 138. The synchronization generator mechanism 142 is a method or a process for generating the synchronization signal 128 using existing instance of the prefix generator mechanism 126.

The synchronization signal 128 repeating the primary synchronization 130 according to the synchronization adjacency structure 138 can be represented as:

$$s(t) = \sum_{k=-31}^{-1} p_k e^{j2\pi\Delta fkt} - \sum_{k=1}^{31} p_k e^{j2\pi\Delta fkt},$$
$$0 \leq t < (N+N_{cp})T_s. \quad \text{Equation (2)}.$$

The term '$p_k$' for 'k=−31 . . . 31' can represent the frequency components or representation of the symbol for the primary synchronization 130. The prefix generator mechanism 126 can use Equation (2) associated with Equation (1), based on choosing '$a_k = p_k e^{j2\pi\Delta fkN_{cp}T_s}$'.

The prefix generator mechanism 126 can further utilize a phase ramp 143. The phase ramp 143 is a method or a process for increasing the phase of the signal linearly according to an index. The phase ramp 143 can be represented as '$e^{j2\pi(1/2)\Delta f(t-N^{cp}jT_s)}$' or '$e^{j2\pi\Delta fkN_{cp}T_s}$' according to targeted waveform format. The phase ramp 143 can increase the phase according to the index 'k', which can represent a tone index for referencing frequencies. The term '$k_{cp}$' can represent number of samples in the cyclic prefix and '$T_s$' can represent a basic time unit.

The prefix generator mechanism 126 can generate the primary synchronization 130 including the synchronization adjacency structure 138 using the prefix generator mechanism 126 intended or designed to implement the alternating pattern 123 based on applying or using the phase ramp 143. Details regarding the use of the phase ramp 143 are discussed below.

The synchronization generator mechanism 142 can be for generating the synchronization signal 128 including the synchronization adjacency structure 138 using the prefix generator mechanism 126 intended or designed to implement the alternating pattern 123. The synchronization generator mechanism 142 can process signals in frequency domain 144, time domain 146, or a combination thereof.

The frequency domain 144 can include a particular area or system of representation for information associated with frequency. For example, the computing system 100 can represent a signal by the frequency components therein, a magnitude or an amount of effect thereof, or a combination thereof in the frequency domain 144.

The time domain 146 can include a particular area or system of representation for information associated with time. For example, the computing system 100 can represent a signal by magnitudes and timing, a specific time, a relative comparison, or a combination thereof associated with detection of the magnitude.

The synchronization generator mechanism 142 can include or utilize a domain transfer mechanism 148. The domain transfer mechanism 148 can include a method or a process for exchanging information between the frequency domain 144 and the time domain 146. The domain transfer mechanism 148 can calculate information from the time domain 146 into the frequency domain 144, from the frequency domain 144 into the time domain 146, or a combination thereof.

For example, the domain transfer mechanism 148 can include implementation of the Fourier transform. As a more specific example, the domain transfer mechanism 148 can include implementations of Fast Fourier Transform (FFT) or Discrete Fourier Transform (DFT).

The synchronization generator mechanism 142 can utilize the domain transfer mechanism 148 in generating the synchronization signal 128. For example, the synchronization generator mechanism 142 can calculate a first frequency-synchronization 150, a second frequency-synchronization 152, or a combination thereof from a first time-synchronization 154, a second time-synchronization 156, or a combination thereof. Also for example, the synchronization generator mechanism 142 can calculate the first time-synchronization 154, the second time-synchronization 156, or a combination thereof from the first frequency-synchronization 150, the second frequency-synchronization 152, or a combination thereof.

The first frequency-synchronization 150 can include the first synchronization symbol 134 represented in the frequency domain 144. The second frequency-synchronization 152 can include the second synchronization symbol 136 represented in the frequency domain 144. The first time-synchronization 154 can include the first synchronization symbol 134 represented in the time domain 146. The second time-synchronization 156 can include the second synchronization symbol 136 represented in the time domain 146. Details regarding the synchronization generator mechanism 142 and the synchronization signal 128 are described below.

The computing system 100 can implement the various mechanisms described above in various ways. For example, the computing system 100 can implement the prefix generator mechanism 126, the synchronization generator mechanism 142, or a combination thereof using hardware, software, firmware, or a combination thereof. As a more specific example, the various mechanisms can be implemented using circuits, active or passive, gates, arrays, feedback loops, feed-forward loops, hardware connections, functions or function calls, instructions, equations, data manipulations, structures, addresses, or a combination thereof.

Figure 2:
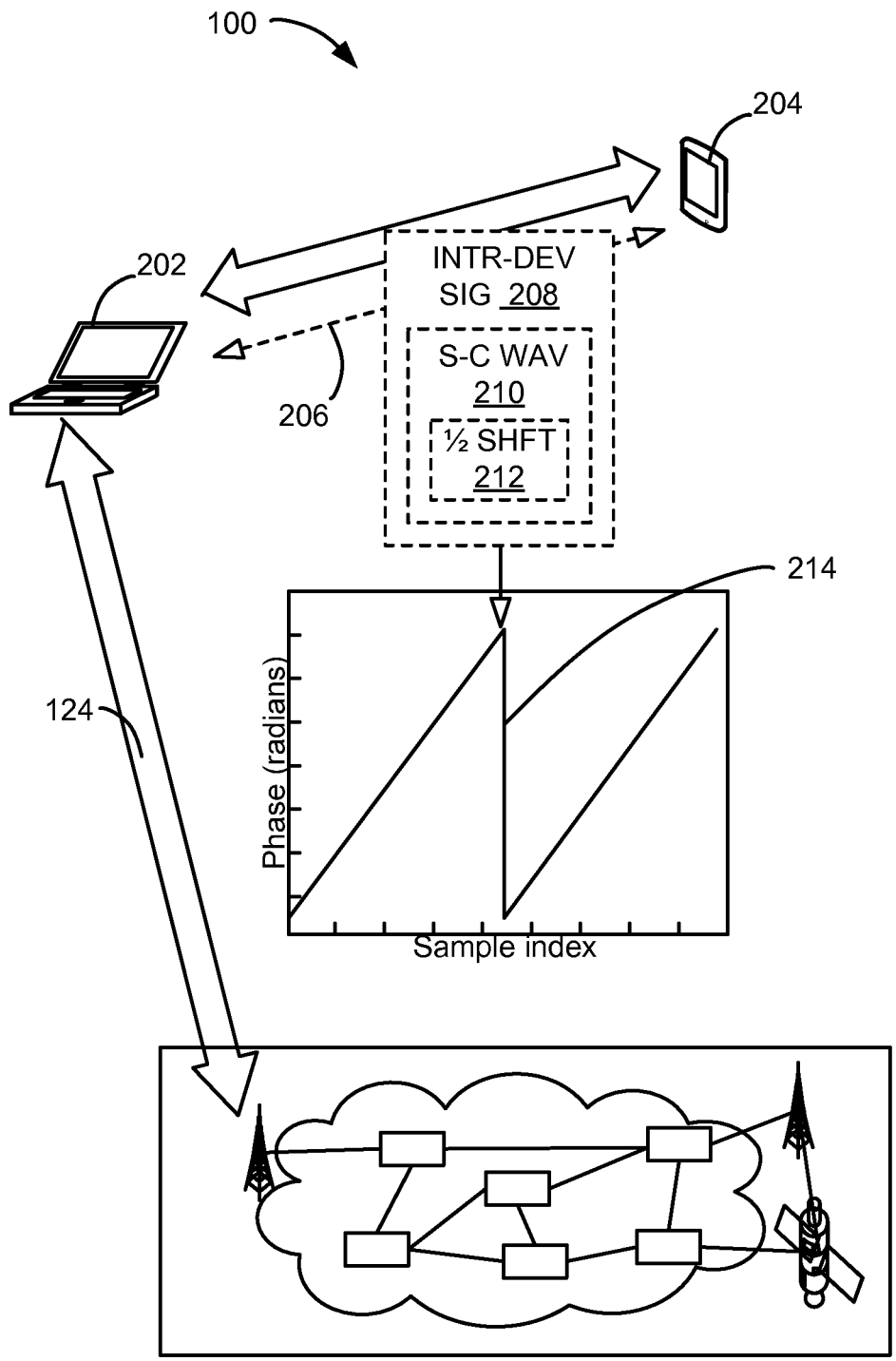
FIG. 2 is an exemplary illustration of the computing system.

Referring now to FIG. 2, therein is an exemplary illustration of the computing system 100. The computing system 100 can include multiple instances of the user electronic device 102 of FIG. 1, the access node 106 of FIG. 1, or a combination thereof. For example, the computing system 100 can include a first user device 202, a second user device 204, or a combination thereof.

The computing system 100 can utilize direct-link communication 206 to communicate information. The direct-link communication 206 is a mode or a type of communication for providing cellular communication directly between instances of the user electronic device 102 without utilizing the access node 106 to relay the signals.

The access node 106 can designate communication control parameters, such as for carrier frequency or frequency band, MCS, coding, time slots, signal strength, communication standard or protocol, or a combination thereof for directly exchanging information between the first user device 202 and the second user device 204 without communicating through the access node 106. The direct-link communication 206 can be for modeling the inter-node communication 124 without going through the access node 106 or the network 104 of FIG. 1 to communicate the serving content 110 of FIG. 1 serving signal 108 of FIG. 1 between instances of the user electronic device 102.

The direct-link communication 206 can include cellular communications, such as voice, text, image, instructions, or a combination of data exchanged between instances of the user electronic device 102. The direct-link communication 206 can be separate and different from connecting to accessory devices, and from connecting using non-cellular protocols. For example, the direct-link communication 206 can be separate and different from Bluetooth communication, near field communication (NFC), or a combination thereof. Also for example, the direct-link communication 206 can be separate from fix frequency dedicated communication, such as used in walkie-talkies or various signal broadcasts.

The instances of the user electronic device 102 can exchange inter-device signal 208 using direct-link channel. The inter-device signal 208 can include the serving signal 108 transmitted for direct communication to an intended end device instead of the access node 106, and without going through the access node 106. The inter-device signal 208 can communicate the serving content 110.

The direct-link channel can include a path or a link for signal exchange including physical or wireless connections, protocols, route, or a combination thereof directly linking instances of the user electronic device 102. The direct-link channel can include a connection between grouped instances of the user electronic device 102 without any other device there-between, without the access node 106 there-between, or a combination thereof.

The computing system 100 can generate the synchronization signal 128 of FIG. 1 for the direct-link communication 206. The computing system 100 can generate the synchronization signal 128 for the direct-link communication 206 based on the synchronization generator mechanism 142 of FIG. 1 utilizing the prefix generator mechanism 126 of FIG. 1 designed or intended for the alternating pattern 123 of FIG. 1 between the symbol and the prefix portion 114 of FIG. 1.

As a more specific example, the computing system 100 can generate the synchronization signal 128 based on a single-carrier waveform 210, orthogonal waveform, or a combination thereof. The orthogonal waveform can be a waveform based on orthogonal FDM (OFDM) scheme. The single-carrier waveform 210 can be a waveform based on single-carrier frequency division multiplex (SC-FDM). The single-carrier waveform 210 can be associated with linearly precoded OFDM scheme. The single-carrier waveform 210 can include a format for the waveform for communicating the synchronization signal 128.

The single-carrier waveform 210 can be represented as:

$$s_l^{(p)}(t) = \sum_{k=-[N_{RB}^{UL}N_{SC}^{RB}/2]}^{[N_{RB}^{UL}N_{SC}^{RB}/2]-1} a_{k^{(-)},l}^{(p)} e^{j2\pi(k+1/2)\Delta f(t-N_{CP,l}T_s)}. \quad \text{Equation (3).}$$

The time-continuous signal for the single-carrier waveform 210 can be represented as '$s_l^{(p)}(t)$' for port 'p'. The term 'l' can represent a specific instance of the symbol. The term '$k^{(-)}$' can be further represented as '$k^{(-)}=k+[N_{RB}^{UL}N_{RB}^{RB}/2]$'. The term '$a_{k^{(-)},l}^{(p)}$' can represent the content of resource element '(k, l)' on antenna port 'p'.

The single-carrier waveform 210 can be based on a half-subcarrier shift 212. The half-subcarrier shift 212 is a change in characteristic of the transmitted signal. The half-subcarrier shift 212 can include a change in the phase of a signal across symbol boundary characteristic of utilizing the single-carrier waveform 210. The computing system 100 can apply the half-subcarrier shift 212 in communicating with the single-carrier waveform 210. The computing system 100 can use the single-carrier waveform 210 to communicate the synchronization signal 128, the serving signal 108, or a combination thereof.

The half-subcarrier shift 212 can be based on reapplying the phase ramp 143 of FIG. 1 for each instance of the symbol. The phase ramp 143 can be applied to sample at time instance 't' within each symbol. The phase rotation from the phase ramp 143 can be reset at every symbol boundary, and the phase is discontinuous across consecutive symbols.

The single-carrier waveform 210 can include a phase discontinuity 214. The phase discontinuity 214 is a discontinuity across symbol boundary characteristic of utilizing the single-carrier waveform 210. The phase discontinuity 214 can be the result or the effect from the half-subcarrier shift 212. The phase discontinuity 214 can include a reset in phase rotation of the transmitted signal at each or every symbol boundary, such as for each instance of the message segments 112 of FIG. 1. The phase discontinuity 214 can represent discontinuity in phase across consecutive symbols across the message segments 112.

The phase discontinuity 214 at the symbol boundary can be represented as 'is $\pi(1+\Delta f(N_{CP,l}T_s))$'. The computing system 100 can use the synchronization generator mechanism 142 to apply the phase ramp 143, or a derivation thereof represented as '$e^{j\pi(1+\Delta f(N_{CP,l}T_s))}$', to the second symbol 118 of FIG. 1 to ensure phase continuity.

The computing system 100 can use the synchronization generator mechanism 142 to utilize the prefix generator mechanism 126 to generate the synchronization signal 128 for the OFDM waveform, the single-carrier waveform 210, or a combination thereof. The synchronization generator mechanism 142 can process the half-subcarrier shift 212, the phase discontinuity 214, or a combination thereof for the synchronization signal 128 utilizing the single-carrier waveform 210. Details regarding the processing of the half-subcarrier shift 212 and the phase discontinuity 214 for generating the synchronization signal 128 utilizing the single-carrier waveform 210 are discussed below.

Figure 3:
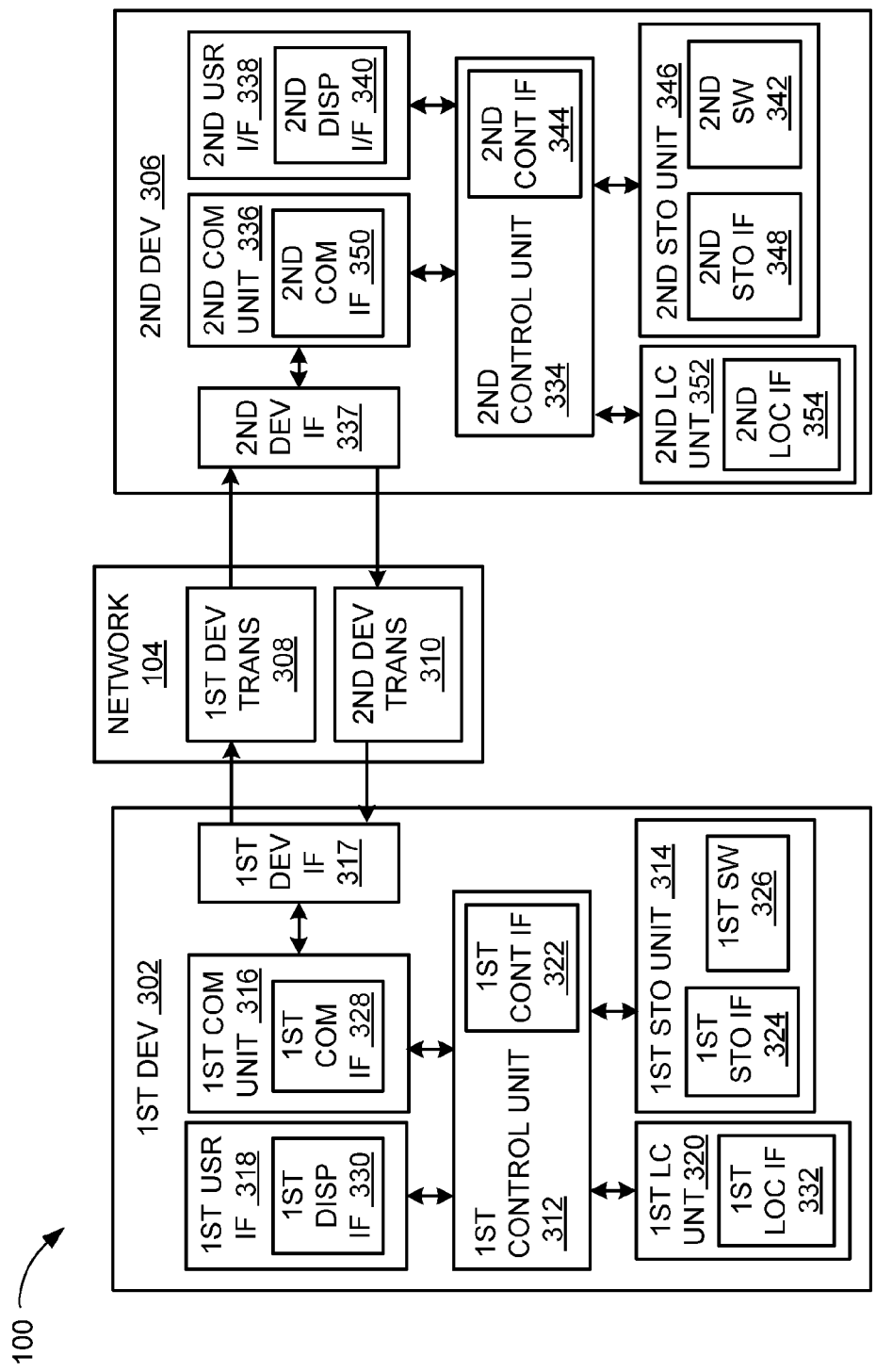
FIG. 3 is an exemplary block diagram of the computing system.

Referring now to FIG. 3, therein is shown an exemplary block diagram of the computing system 100. The computing system 100 can include a first device 302, the network 104, and a second device 306. The first device 302, the second device 306, or a combination thereof can illustrate the user electronic device 102 of FIG. 1, the access node 106 of FIG. 1, or a combination thereof. For example, the first device 302, the second device 306, or a combination thereof can exemplify the first user device 202 of FIG. 2, the second user device 204 of FIG. 2, or a combination thereof.

The first device 302 can send information in a first device transmission 308 over the network 104 to the second device 306. The second device 306 can send information in a second device transmission 310 over the network 104 to the first device 302.

For illustrative purposes, the computing system 100 is shown with the first device 302 as a client device, although it is understood that the computing system 100 can have the first device 302 as a different type of device. For example, the first device 302 can be a server having a display interface.

Also for illustrative purposes, the computing system 100 is shown with the second device 306 as a base station, although it is understood that the computing system 100 can have the second device 306 as a different type of device. For example, the second device 306 can be a client device.

For brevity of description in this embodiment of the present invention, the first device 302 will be described as a client device and the second device 306 will be described as a server device. The embodiment of the present invention is not limited to this selection for the type of devices. The selection is an example of an embodiment of the present invention.

The first device 302 can include a first control unit 312, a first storage unit 314, a first communication unit 316, a first user interface 318, and a first location unit 320. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 302. The first control interface 322 can also be used for communication that is external to the first device 302.

The first control interface 322 can receive information from the other functional units or from external sources, or can transmit information to the other functional units or to external destinations. The external sources and the external destinations refer to sources and destinations external to the first device 302.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 302. The first storage interface 324 can also be used for communication that is external to the first device 302.

The first storage interface 324 can receive information from the other functional units or from external sources, or can transmit information to the other functional units or to external destinations. The external sources and the external destinations refer to sources and destinations external to the first device 302.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 302. For example, the first communication unit 316 can permit the first device 302 to communicate with the second device 306, a different device, an attachment, such as a peripheral device or a desktop computer, the network 104, or a combination thereof.

The first communication unit 316 can also function as a communication hub allowing the first device 302 to function as part of the network 104 and not limited to be an end point or terminal unit to the network 104. The first communication unit 316 can include active and passive components, such as microelectronics or an antenna, for interaction with the network 104.

The first communication unit 316 can include a baseband device or component, a modem, a digital signal processor, or a combination thereof for transmitting, formatting, receiving, detecting, decoding, further processing, or a combination thereof for communication signals. The first communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The first communication unit 316 can be coupled with a first inter-device interface 317. The first inter-device interface 317 can be a device or a portion of a device for physically communicating signals with a separate device. The first inter-device interface 317 can communicate by transmitting or receiving signals to or from another device. The first inter-device interface 317 can include one or more antennas for wireless signals, a physical connection and receiver-transmitter for wired signals, or a combination thereof. The first inter-device interface 317 can include an omnidirectional antenna, a wire, an antenna chip, a ceramic antenna, or a combination thereof. The first inter-device interface 317 can further include a port, a wire, a repeater, a connector, a filter, a sensor, or a combination thereof.

The first inter-device interface 317 can detect or respond to a power in electromagnetic waves and provide the detected result to the first communication unit 316 to receive a signal, including the second device transmission 310. The first inter-device interface 317 can provide a path or respond to currents or voltages provided by the first communication unit 316 to transmit a signal, including the first device transmission 308.

The first communication unit 316 can include a first communication interface 328. The first communication interface 328 can be used for communication between the first communication unit 316 and other functional units in the first device 302. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 302. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100, including receiving location information from the first location unit 320. The first control unit 312 can further execute the first software 326 for interaction with the network 104 via the first communication unit 316.

The first location unit 320 can generate location information, current heading, current acceleration, and current speed of the first device 102, as examples. The first location unit 320 can be implemented in many ways. For example, the first location unit 320 can function as at least a part of the global positioning system, an inertial navigation system, a cellular-tower location system, a pressure location system, or any combination thereof. Also, for example, the first location unit 320 can utilize components such as an accelerometer or GPS receiver.

The first location unit 320 can include a first location interface 332. The first location interface 332 can be used for communication between the first location unit 320 and other functional units in the first device 302. The first location interface 332 can also be used for communication external to the first device 302.

The first location interface 332 can receive information from the other functional units or from external sources, or can transmit information to the other functional units or to external destinations. The external sources and the external destinations refer to sources and destinations external to the first device 302.

The first location interface 332 can include different implementations depending on which functional units or external units are being interfaced with the first location unit 320. The first location interface 332 can be implemented with technologies and techniques similar to the implementation of the first control unit 312.

The second device 306 can be optimized for implementing an embodiment of the present invention in a multiple device embodiment with the first device 302. The second device 306 can provide the additional or higher performance processing power compared to the first device 302. The second device 306 can include a second control unit 334, a second communication unit 336, a second user interface 338, and a second storage unit 346. The second device 306 can further include a second location unit 352, such as for a mobile device.

The second user interface 338 allows a user (not shown) to interface and interact with the second device 306. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 306 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 302 over the network 104, including receiving location information from the second location unit 352, or a combination thereof.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 306. The second control interface 344 can also be used for communication that is external to the second device 306.

The second control interface 344 can receive information from the other functional units or from external sources, or can transmit information to the other functional units or to external destinations. The external sources and the external destinations refer to sources and destinations external to the second device 306.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 306. The second storage interface 348 can also be used for communication that is external to the second device 306.

The second storage interface 348 can receive information from the other functional units or from external sources, or can transmit information to the other functional units or to external destinations. The external sources and the external destinations refer to sources and destinations external to the second device 306.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 306. For example, the second communication unit 336 can permit the second device 306 to communicate with the first device 302 over the network 104.

The second communication unit 336 can also function as a communication hub allowing the second device 306 to function as part of the network 104 and not limited to be an end point or terminal unit to the network 104. The second communication unit 336 can include active and passive components, such as microelectronics or resistors, for interaction with the network 104.

The second communication unit 336 can include a baseband device or component, a modem, a digital signal processor, or a combination thereof for transmitting, formatting, receiving, detecting, decoding, further processing, or a combination thereof for communication signals. The second communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 336 can further include one or more portions for storing information, such as cache or RAM memory, registers, or a combination thereof.

The second communication unit 336 can be coupled with a second inter-device interface 337. The second inter-device interface 337 can be a device or a portion of a device for physically communicating signals with a separate device. The second inter-device interface 337 can communicate by transmitting or receiving signals to or from another device. The second inter-device interface 337 can include one or more antennas for wireless signals, a physical connection and receiver-transmitter for wired signals, or a combination thereof. The second inter-device interface 337 can include an omnidirectional antenna, a wire, an antenna chip, a ceramic antenna, or a combination thereof. The second inter-device interface 337 can further include a port, a wire, a repeater, a connector, a filter, a sensor, or a combination thereof.

The second inter-device interface 337 can detect or respond to a power in electromagnetic waves and provide the detected result to the second communication unit 336 to receive a signal, including the first device transmission 308. The second inter-device interface 337 can provide a path or respond to currents or voltages provided by the second communication unit 336 to transmit a signal, including the second device transmission 310.

The second communication unit 336 can include a second communication interface 350. The second communication interface 350 can be used for communication between the second communication unit 336 and other functional units in the second device 306. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The second location unit 352 can generate location information, current heading, current acceleration, and current speed of the second device 306, as examples. The second location unit 352 can be implemented in many ways. For example, the second location unit 352 can function as at least a part of the global positioning system, an inertial navigation system, a cellular-tower location system, a pressure location system, or any combination thereof. Also, for example, the second location unit 352 can utilize components such as an accelerometer or GPS receiver.

The second location unit 352 can include a second location interface 354. The second location interface 354 can be used for communication between the second location unit 352 and other functional units in the second device 306. The second location interface 354 can also be used for communication external to the second device 306.

The second location interface 354 can receive information from the other functional units or from external sources, or can transmit information to the other functional units or to external destinations. The external sources and the external destinations refer to sources and destinations external to the second device 306.

The second location interface 354 can include different implementations depending on which functional units or external units are being interfaced with the second location unit 352. The second location interface 354 can be implemented with technologies and techniques similar to the implementation of the second control unit 334.

The first communication unit 316 can utilize the node-relaying communication 216 of FIG. 2 or the direct-link communication 220 to send information to the second device 306 in the first device transmission 308. The second device 306 can receive information in the second communication unit 336 from the first device transmission 308 according to the node-relaying communication 216 or the direct-link communication 220.

The second communication unit 336 can utilize the node-relaying communication 216 or the direct-link communication 220 to send information to the first device 302 in the second device transmission 310. The first device 302 can receive information in the first communication unit 316 from the second device transmission 310 according to the node-relaying communication 216 or the direct-link communication 220.

The computing system 100 can be executed by the first control unit 312, the second control unit 334, or a combination thereof. For illustrative purposes, the second device 306 is shown with the partition having the second user interface 338, the second storage unit 346, the second control unit 334, and the second communication unit 336, although it is understood that the second device 306 can have a different partition. For example, the second software 342 can be partitioned differently such that some or all of its function can be in the second control unit 334 and the second communication unit 336. Also, the second device 306 can include other functional units not shown in FIG. 3 for clarity.

The functional units in the first device 302 can work individually and independently of the other functional units. The first device 302 can work individually and independently from the second device 306 and the network 104.

The functional units in the second device 306 can work individually and independently of the other functional units. The second device 306 can work individually and independently from the first device 302 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 302 and the second device 306. It is understood that the first device 302 and the second device 306 can operate any of the modules and functions of the computing system 100.

Figure 4:
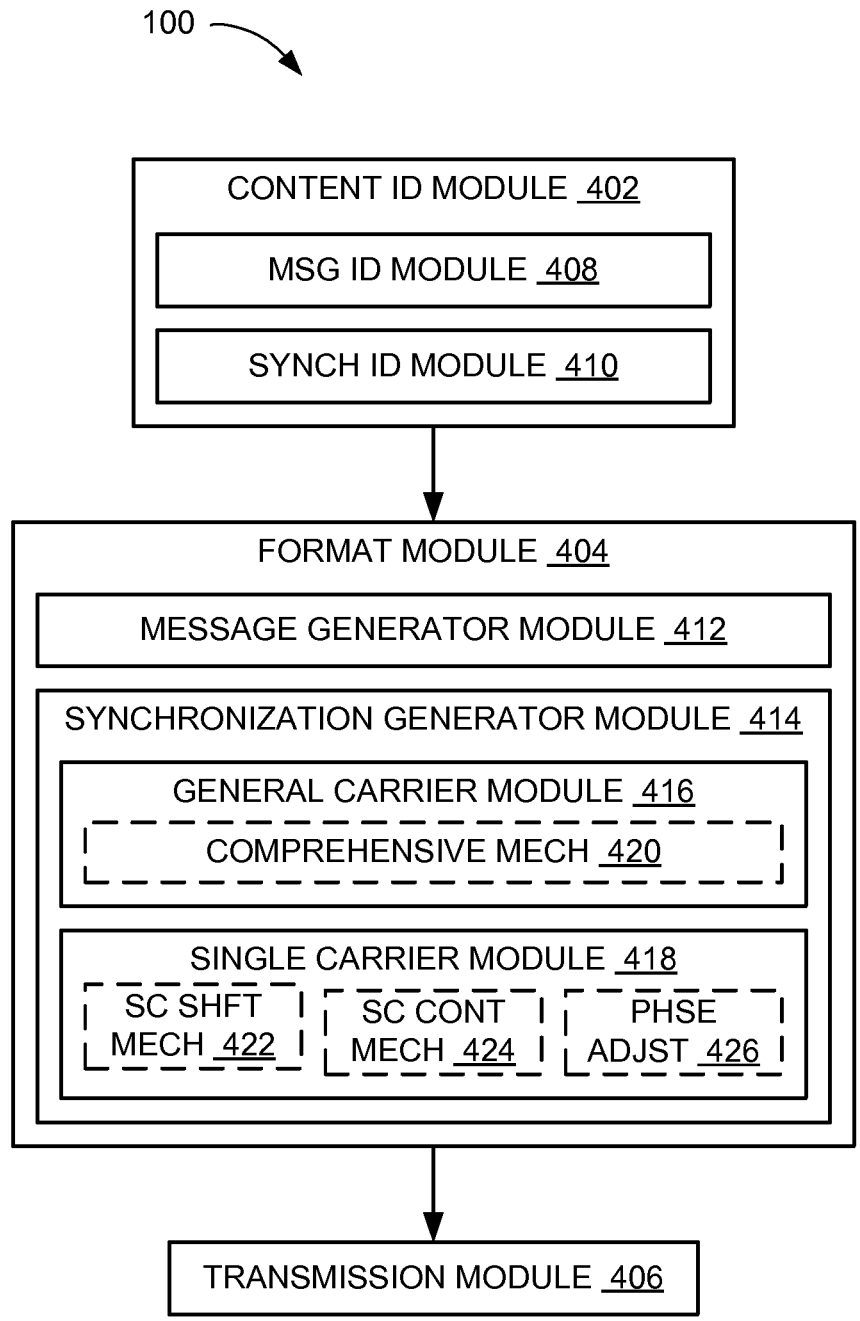
FIG. 4 is a control flow of the computing system.

Referring now to FIG. 4, therein is shown a control flow of the computing system 100. The computing system 100 can include a content identification module 402, a format module 404, a transmission module 406, or a combination thereof. The content identification module 402 can be coupled with the format module 404, which can be further coupled with the transmission module 406.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the content identification module 402 can be connected to one or more inputs or outputs of the format module 404 using conductors or the communication channel without intervening modules or devices there-between for direct coupling. Also for example, the content identification module 402 can be coupled to the format module 404 indirectly using a wireless channel with a repeater, a switch, a routing device, or a combination thereof. The content identification module 402, the format module 404, the transmission module 406, or a combination thereof can be coupled in similar ways as described above.

The computing system 100 can communicate information between devices, such as by sending, transmitting, receiving, coding, decoding, or a combination thereof. The receiving device can further communicate with the user by displaying images, recreating sounds, exchanging process steps or instructions, or a combination thereof according to the information communicate to the device.

The content identification module 402 is configured to identify the symbols corresponding to the content. The content identification module 402 can identify the symbols corresponding to the serving content 110 of FIG. 1, the synchronization signal 128 of FIG. 1, or a combination thereof. The content identification module 402 can include a message identification module 408, a synchronization identification module 410, or a combination thereof for identifying the symbols.

The message identification module 408 is configured to identify the symbols corresponding to the serving content 110. The message identification module 408 can identify the serving content 110 for communicating between devices. The message identification module 408 can identify the serving content 110 by interfacing with the user or receiving the intended information from the user. For example, the message identification module 408 can use the first user interface 318 of FIG. 3, the second user interface 338 of FIG. 3, the user interface of the access node 106 of FIG. 1, or a combination thereof to interact with the user or receive information from the user, such as for a voice signal for a phone call or text information through an input interface.

The message identification module 408 can further identify the serving content 110 by accessing stored information or information received from another device. For example, the message identification module 408 can use the first communication interface 328 of FIG. 3, the second communication interface 350 of FIG. 3, the first storage interface 324 of FIG. 3, the second storage interface 348 of FIG. 3, storage interface or communication interface of the access node 106, or a combination thereof to access the stored information or the information from another device.

The message identification module 408 can identify the symbols corresponding to the serving content 110 according to the modulation constellation or scheme, the MCS, or a combination thereof. The message identification module 408 can use the first communication unit 316 of FIG. 3, the second communication unit 336 of FIG. 3, the first control unit 312 of FIG. 3, the second control unit 334 of FIG. 3, the communication unit or the control unit of the access node 106, or a combination thereof to identify the MCS, the modulation scheme or constellation, or a combination thereof, and to identify the symbols matching the serving content 110.

The synchronization identification module 410 is configured to identify or construct the symbols corresponding to the synchronization signal 128. The synchronization identification module 410 can identify or construct the first symbol 116 of FIG. 1, the second symbol 118 of FIG. 1, or a combination thereof corresponding to the primary synchronization 130 of FIG. 1, the first synchronization symbol 134 of FIG. 1 thereof, the second synchronization symbol 136 of FIG. 1 thereof, the secondary synchronization 132 of FIG. 1, or a combination thereof for the synchronization signal 128.

The synchronization identification module 410 can identify or construct the symbols corresponding to the MCS, the modulation scheme or constellation, the communication protocol or standard, or a combination thereof. The synchronization identification module 410 can further identify or construct the symbols according to a method, a process, a data or a value, or a combination thereof predetermined by the computing system 100.

The synchronization identification module 410 can identify or construct the symbols in the time domain 146 of FIG. 1, the frequency domain 144 of FIG. 1, or a combination thereof. The synchronization identification module 410 can identify based on identifying or selecting a set of values, intensity, level, or a combination thereof for signal intensity or magnitude according to a timing, a sequence, an order, a relative delay or separation, or a combination thereof in time or frequency. The synchronization identification module 410 can construct based on assigning or designating a set of values, intensity, level, or a combination thereof for signal intensity or magnitude according to a timing, a sequence, an order, a relative delay or separation, or a combination thereof in time or frequency.

The content identification module 402 can use the first communication unit 316, the second communication unit 336, the first control unit 312, the second control unit 334, the communication unit or the control unit of the access node 106, or a combination thereof to identify the symbols corresponding to the serving content 110, the synchronization signal 128, or a combination thereof. The content identification module 402 can stored the identified symbols in the first communication unit 316, the second communication unit 336, the first storage unit 314 of FIG. 3, the second storage unit 346 of FIG. 3, or a combination thereof.

After identifying the symbols, the control flow can pass to the format module 404. The control flow can pass through a variety of ways. For example, control flow can pass by having processing results of one module passed to another module, such as by passing the symbols, including the first synchronization symbol 134, the second synchronization symbol 136, the first symbol 116, the second symbol 118, or a combination thereof from the content identification module 402 to the format module 404, by storing the processing results at a location known and accessible to the other module, such as by storing passing the symbols, including the first synchronization symbol 134, the second synchronization symbol 136, the first symbol 116, the second symbol 118, or a combination thereof at a storage location known and accessible to the format module 404, by notifying the other module, such as by using a flag, an interrupt, a status signal, or a combination for the format module 404, or a combination of processes thereof.

The format module 404 is configured to process the identified symbols for communication. The format module 404 can generate the serving signal 108 of FIG. 1, the message segments 112 of FIG. 1 therein, the synchronization signal 128, or a combination thereof.

For example, the format module 404 can arrange or order the content, add additional information, or a combination thereof. As a more specific example, the format module 404 can generate and add the prefix portion 114 of FIG. 1, such as the first prefix 120 of FIG. 1 or the second prefix 122 of FIG. 1 for the serving signal 108. Also as a more specific example, the format module 404 can generate the synchronization signal 128 according to the synchronization adjacency structure 138 of FIG. 1. The format module 404 can include a message generator module 412, a synchronization generator module 414, or a combination thereof for processing the identified symbols.

The message generator module 412 is configured to generate the serving signal 108. The message generator module 412 can generate the serving signal 108 using the prefix generator mechanism 126 of FIG. 1. The message generator module 412 can generate the prefix portion 114 corresponding to the identified symbols. The message generator module 412 can generate the prefix portion 114 according to the prefix generator mechanism 126 predetermined by the computing system 100, the communication standard or configuration, or a combination thereof.

For example, the message generator module 412 can generate the prefix portion 114, such as the first prefix 120 or the second prefix 122 as a portion of the corresponding instance of the symbol. As a more specific example, the message generator module 412 can generate the first prefix 120 as the last predetermined portion of information within the first symbol 116, the second prefix 122 as the last predetermined portion of information within the second symbol 118, or a combination thereof.

The message generator module 412 can add or combine the prefix portion 114 to precede the corresponding symbol to generate the message segments 112 for the serving signal 108. The message generator module 412 can add or combine the prefix portion 114 according to the alternating pattern 123 as originally intended or designed for the prefix generator mechanism 126. For example, the message generator module 412 can generate the serving signal 108 to include the first prefix 120 immediately preceding the first symbol 116, the second prefix 122 immediately preceding the second symbol 118, or a combination thereof in the time domain 146.

The synchronization generator module 414 is configured to generate the synchronization signal 128. The synchronization generator module 414 can generate the synchronization signal 128 corresponding to the identified symbols for the synchronization signal 128. The synchronization generator module 414 can use the synchronization generator mechanism 142 of FIG. 1 with the prefix generator mechanism 126 originally intended or designed to implement the alternating pattern 123 for the symbol and the prefix portion 114.

The synchronization generator module 414 can use the synchronization generator mechanism 142 with the prefix generator mechanism 126 and generate the synchronization signal 128 including the first synchronization symbol 134 and the second synchronization symbol 136 according to the synchronization adjacency structure 138. The synchronization generator module 414 can use the synchronization generator mechanism 142 to adjust for the alternating pattern 123 originally intended or designed for the prefix generator mechanism 126 and implement the synchronization adjacency structure 138 for the synchronization signal 128.

The synchronization generator module 414 can generate the synchronization signal 128 including the first synchronization symbol 134 and the second synchronization symbol 136 consecutive to each other, abutting each other, or directly following one another in time without any other data therebetween according to the synchronization generator mechanism. The synchronization generator module 414 can generate the synchronization signal 128 for the OFDM waveform, the single-carrier waveform 210 of FIG. 2, or a combination thereof.

The synchronization generator module 414 can generate the synchronization signal 128 including the prefix remainder 140 of FIG. 1. The synchronization generator module 414 can generate the synchronization signal 128 including the prefix remainder 140 following the first synchronization symbol 134 and the second synchronization symbol 136. The synchronization generator module 414 can include a general carrier module 416, a single carrier module 418, or a combination thereof for generating the synchronization signal 128.

The general carrier module 416 is configured to generate the synchronization signal 128 for the OFDM waveform. The general carrier module 416 can use the synchronization generator mechanism 142 and the prefix generator mechanism 126 to generate the synchronization signal 128 for the OFDM waveform. The general carrier module 416 can include a comprehensive mechanism 420.

The comprehensive mechanism 420 is a method or a process for generating the synchronization signal 128 for the OFDM waveform using existing instance of the prefix generator mechanism 126. The general carrier module 416 can use the comprehensive mechanism 420 to adjust for the alternating pattern 123 originally intended or designed for the prefix generator mechanism 126 and implement the synchronization adjacency structure 138 for the synchronization signal 128.

The general carrier module 416 can generate the synchronization signal 128 using the phase ramp 143 of FIG. 1. The general carrier module 416 can use the comprehensive mechanism 420 to generate the synchronization signal 128 based on the OFDM waveform and including the first synchronization symbol 134 and the second synchronization symbol 136 consecutively without any intervening data according to the synchronization adjacency structure 138.

The general carrier module 416 can use the comprehensive mechanism 420 to generate the synchronization signal 128 based on processing the first symbol 116, the second symbol 118, or a combination thereof in the frequency domain 144, the time domain 146, or a combination thereof. For example, the general carrier module 416 can generate the synchronization signal 128 based on processing the first frequency-synchronization 150 of FIG. 1, the second frequency-synchronization 152 of FIG. 1, the first time-synchronization 154 of FIG. 1, the second time-synchronization 156 of FIG. 1, or a combination thereof.

For example, the general carrier module 416 can use the comprehensive mechanism 420 to generate the synchronization signal 128 based on applying the phase ramp 143 to the first symbol 116, the second symbol 118, or a combination thereof. The general carrier module 416 can apply the phase ramp 143 to the first symbol 116, the second symbol 118, the first synchronization symbol 134 corresponding thereto, the second synchronization symbol 136 corresponding thereto, or a combination thereof in the frequency domain 144, the time domain 146, or a combination thereof.

As a more specific example, the general carrier module 416 can receive the primary synchronization 130 constructed or identified first in the frequency domain 144. The general carrier module 416 can receive the first synchronization symbol 134, the second synchronization symbol 136, the first frequency-synchronization 150, the second frequency-synchronization 152, or a combination thereof.

Continuing with the example, the general carrier module 416 can further receive the first symbol 116, the second symbol 118, or a combination thereof and construct the first synchronization symbol 134, the second synchronization symbol 136, or a combination thereof in the frequency domain 144. The general carrier module 416 can generate the first frequency-synchronization 150, the second frequency-synchronization 152, or a combination thereof for constructing the first synchronization symbol 134, the second synchronization symbol 136, or a combination thereof.

Continuing with the specific example, the general carrier module 416 can use the comprehensive mechanism 420 for multiplying the phase ramp 143, such as for '$e^{j2\pi \Delta f k N_{cp} T_s}$', to the first synchronization symbol 134, the second synchronization symbol 136, the first symbol 116, the second symbol 118, the first synchronization symbol 134, the second synchronization symbol 136, or a combination thereof in the frequency domain 144. The general carrier module 416 can use the comprehensive mechanism 420 for generating the synchronization signal 128 in the time domain 146 based on a result of applying the phase ramp 143 in the frequency domain 144, such as using the domain transfer mechanism 148 of FIG. 1.

Continuing with the specific example, the general carrier module 416 can generate the synchronization signal 128 based on constructing or identifying the first synchronization symbol 134, the second synchronization symbol 136, or a combination thereof as the primary synchronization 130. The general carrier module 416 can multiply the second synchronization symbol 136, the second symbol 118, the second frequency-synchronization 152, or a combination thereof including the primary synchronization 130 with the phase ramp 143 in the frequency domain 144. The general carrier module 416 can multiply based on Equation (2), based on choosing '$a_k = p_k e^{j2\pi \Delta f k N_{cp} T_s}$'.

Multiplication in the frequency domain 144 can be equivalent to circularly shifting in the time domain 146. The result of multiplying the second synchronization symbol 136 with the phase ramp 143 can include the first synchronization symbol 134 consecutive with the second synchronization symbol 136 without any intervening data or information there-between, according to the synchronization adjacency structure 138.

The result of multiplying the second synchronization symbol 136, the second symbol 118, the second frequency-synchronization 152, or a combination thereof with the phase ramp 143 can further include the prefix remainder 140 following the first synchronization symbol 134 and the second synchronization symbol 136. The result can further include the prefix remainder 140 after the first synchronization symbol 134 and the second synchronization symbol 136 instead of the second prefix 122 between the first synchronization symbol 134 and the second synchronization symbol 136, preceding the second synchronization symbol 136.

Multiplying the second synchronization symbol 136, the second symbol 118, the second frequency-synchronization 152, or a combination thereof with the phase ramp 143 in the frequency domain 144 can result in the synchronization signal 128 including the prefix remainder 140, the first synchronization symbol 134 and the second synchronization symbol 136 according to the synchronization adjacency structure 138, or a combination thereof. The resulting instance of the synchronization signal 128 from the comprehensive mechanism 420 can include the above results instead of or in adjusting for the second prefix 122 between the first synchronization symbol 134 and the second synchronization symbol 136 according to the alternating pattern 123 originally designed or intended for the prefix generator mechanism 126. The prefix remainder 140 can further include different values or content than the second prefix 122.

It has been discovered that the synchronization generator mechanism 142 provides reduced processing complexity and increased flexibility. The synchronization generator mechanism 142 allows for use or reuse of legacy system or existing system for the prefix generator mechanism 126 in generating the synchronization signal 128.

It has further been discovered that the comprehensive mechanism 420 for applying the phase ramp 143 to the second synchronization symbol 136, the second frequency-synchronization 152, the second symbol 118, or a combination thereof in constructing the second synchronization symbol 136 in the frequency domain 144 provides reduced physical size and processing burden. The synchronization generator mechanism 142 can enable use of the existing instance of the prefix generator mechanism 126 for generating the synchronization signal 128 for the direct-link communication 206 of FIG. 2.

The general carrier module 416 can use the first communication unit 316, the second communication unit 336, the first control unit 312, the second control unit 334, the communication unit or the control unit of the access node 106, or a combination thereof to generate the synchronization signal 128, such as including applying the phase ramp 143, processing in the time domain 146, the frequency domain 144, or a combination thereof. The general carrier module 416 can store the processing result, such as from applying the phase ramp 143, processing in the time domain 146, the frequency domain 144, or a combination thereof in the first communication unit 316, the second communication unit 336, the first storage unit 314, the second storage unit 346, the communication unit or the storage unit of the access node 106, or a combination thereof.

The single carrier module 418 is configured to generate the synchronization signal 128 for the single-carrier waveform 210 of FIG. 2. The single carrier module 418 can use the synchronization generator mechanism 142 and the prefix generator mechanism 126 to generate the synchronization signal 128 for the single-carrier waveform 210. The single carrier module 418 can include a single-carrier shifting mechanism 422, a single-carrier continuous mechanism 424, or a combination thereof.

The single-carrier shifting mechanism 422 and the single-carrier continuous mechanism 424 are each a unique method or a unique process for generating the synchronization signal 128 for the single-carrier waveform 210 using existing instance of the prefix generator mechanism 126. The single carrier module 418 can use the single-carrier shifting mechanism 422, the single-carrier continuous mechanism 424, or a combination thereof to adjust for the alternating pattern 123 originally intended or designed for the prefix generator mechanism 126 and implement the synchronization adjacency structure 138 for the synchronization signal 128 based on the single-carrier waveform 210.

The single carrier module 418 can use the single-carrier shifting mechanism 422, the single-carrier continuous mechanism 424, or a combination thereof to generate the synchronization signal 128 based on the single-carrier waveform 210 and including the first synchronization symbol 134 and the second synchronization symbol 136 consecutively without any intervening data according to the synchronization adjacency structure 138. The single carrier module 418 can generate the synchronization signal 128 based on processing the first synchronization symbol 134, the second synchronization symbol 136, the first symbol 116, the second symbol 118, or a combination thereof or a combination thereof in the frequency domain 144, the time domain 146, or a combination thereof.

The single carrier module 418 can further generate the synchronization signal 128 using the phase ramp 143. The single carrier module 418 can use the single-carrier shifting mechanism 422, the single-carrier continuous mechanism 424, or a combination thereof to generate the synchronization signal 128 based on removing the phase discontinuity 214 of FIG. 2 and ensuring phase continuity at the symbol boundary or between the first synchronization symbol 134 and the second synchronization symbol 136.

For example, the single carrier module 418 can use the single-carrier shifting mechanism 422, the single-carrier continuous mechanism 424, or a combination thereof to generate the synchronization signal 128 based on applying the phase ramp 143, such as for '$e^{j2\pi(1/2)\Delta f(t-N^{cp}T_s)}$', to the first synchronization symbol 134, the second synchronization symbol 136, the first symbol 116, the second symbol 118, the first frequency-synchronization 150, the second frequency-synchronization 152, the first time-synchronization 154, the second time-synchronization 156, or a combination thereof. Also for example, the single carrier module 418 can use the single-carrier shifting mechanism 422, the single-carrier continuous mechanism 424, or a combination thereof to apply the phase ramp 143 to the first synchronization symbol 134, the second synchronization symbol 136, the first symbol 116, the second symbol 118, or a combination thereof in the frequency domain 144, the time domain 146, or a combination thereof.

As a more specific example, the single carrier module 418 can receive the primary synchronization 130 constructed or identified first in the frequency domain 144. The single carrier module 418 can receive the first synchronization symbol 134, the second synchronization symbol 136, the first symbol 116, the second symbol 118, the first frequency-synchronization 150, the second frequency-synchronization 152, or a combination thereof in the frequency domain 144.

Continuing with the specific example, the single carrier module 418 can further construct the second synchronization symbol 136 in the primary synchronization 130 for the direct-link communication 206, such as primary device-to-device synchronization signal (PD2DSS), by multiplying the first synchronization symbol 134, the first symbol 116, the first frequency-synchronization 150, or a combination thereof with the phase ramp 143 in the frequency domain 144 for the single-carrier waveform 210. The single carrier module 418 can use the single-carrier shifting mechanism 422 to apply, such as by multiplying, the first synchronization symbol 134, the first symbol 116, the first frequency-synchronization 150, or a combination thereof with the phase ramp 143 in frequency domain 144 to obtain two consecutive PSS symbols for the synchronization adjacency structure 138.

Continuing with the specific example, the single carrier module 418 can use the single-carrier shifting mechanism 422 to apply a phase adjustment 426. The phase adjustment 426 is a value or a parameter for adjusting or removing the phase discontinuity 214. The phase adjustment 426 can include a constant, a complex value, or a combination thereof. The phase adjustment 426 can be predetermined by the computing system 100, the communication standard, communication environment, or a combination thereof. The phase adjustment 426 can further be dynamically determined based on the communication environment or the control parameters for the communication. The phase adjustment 426 can be represented as '$e^{j\pi(1+\Delta f(N_{CP1}T_s))}$'.

Continuing with the specific example, the single carrier module 418 can use the single-carrier shifting mechanism 422 to apply the phase adjustment 426 to the first synchronization symbol 134, the second synchronization symbol 136, the first symbol 116, the second symbol 118, or a combination thereof. The single carrier module 418 can apply the phase adjustment 426 to the product of applying the first synchronization symbol 134 or the first symbol 116 with the phase ramp 143.

Continuing with the specific example, the single carrier module 418 can further use the single-carrier shifting mechanism 422 with the prefix generator mechanism 126 for applying the phase ramp 143 to the first synchronization symbol 134, the second synchronization symbol 136, the first symbol 116, the second symbol 118, the first frequency-synchronization 150, the second frequency-synchronization 152, or a combination thereof for the single-carrier waveform 210 in the frequency domain 144. The single carrier module 418 can apply the half-subcarrier shift 212 of FIG. 2 by applying the phase ramp 143 for the single-carrier waveform 210. The single carrier module 418 can apply the half-subcarrier shift 212 for the direct-link communication 206 synchronizing the first user device 202 of FIG. 2 and the second user device 204 of FIG. 2 for communicating the inter-device signal 208 of FIG. 2.

Also as a more specific example, the single carrier module 418 can use the single-carrier continuous mechanism 424 receive the primary synchronization 130 constructed or identified first in the time domain 146. The single carrier module 418 can receive the first synchronization symbol 134, the second synchronization symbol 136, the first symbol 116, the second symbol 118, the first time-synchronization 154, the second time-synchronization 156, or a combination thereof constructed or identified first in the time domain 146 for the single-carrier waveform 210. The single carrier module 418 can receive the first synchronization symbol 134, the second synchronization symbol 136, the first symbol 116, the second symbol 118, the first time-synchronization 154, the second time-synchronization 156, or a combination thereof aggregated or constructed in the time domain 146.

Continuing with the specific example, the single carrier module 418 can further use the single-carrier shifting mechanism 422 with the prefix generator mechanism 126 for applying, such as by multiplying, the phase ramp 143 to the aggregated instance of the first synchronization symbol 134, the second synchronization symbol 136, the first symbol 116, the second symbol 118, the first time-synchronization 154, the second time-synchronization 156, or a combination thereof. The single carrier module 418 can apply the phase ramp 143 in the time domain. The single carrier module 418 can apply a continuous phase rotation using the phase ramp 143.

The synchronization generator module 414, using the single-carrier continuous mechanism 424 or the single-carrier shifting mechanism 422, can generate the synchronization signal 128 based on the single-carrier waveform 210 including the first synchronization symbol 134 and the second synchronization symbol 136 according to the synchronization adjacency structure 138 using the prefix generator mechanism 126 as described above. Above described processes for the single-carrier waveform 210 can include the first synchronization symbol 134 consecutive with the second synchronization symbol 136 without any intervening data or information there-between, according to the synchronization adjacency structure 138.

The synchronization generator module 414 can further generate the synchronization signal 128 including the prefix remainder 140 following the first synchronization symbol 134 and the second synchronization symbol 136. The synchronization signal 128 can include the prefix remainder 140 after the first synchronization symbol 134 and the second synchronization symbol 136 instead of the second prefix 122 between the first synchronization symbol 134 and the second synchronization symbol 136, preceding the second synchronization symbol 136.

Resulting instance of the synchronization signal 128 including the prefix remainder 140, the first synchronization symbol 134 and the second synchronization symbol 136 according to the synchronization adjacency structure 138, or a combination thereof. Resulting instance of the synchronization signal 128 from the single-carrier continuous mechanism 424 or the single-carrier shifting mechanism 422 can include the above results instead of or in adjusting for the second prefix 122 between the first synchronization symbol 134 and the second synchronization symbol 136 according to the alternating pattern 123 originally designed or intended for the prefix generator mechanism 126. The prefix remainder 140 can further include different values or content than the second prefix 122.

It has been discovered that the single-carrier continuous mechanism 424 for constructing the second synchronization symbol 136 with the phase adjustment 426 provides reduced processing complexity and increased flexibility. The single-carrier continuous mechanism 424 allows for use or reuse of legacy system or existing system for the prefix generator mechanism 126 in generating the synchronization signal 128.

It has further been discovered that the single-carrier shifting mechanism 422 for constructing the first synchronization symbol 134 and the second synchronization symbol 136 together and applying the continuous phase rotation all in the time domain 146 provides reduced physical size and processing burden. The single-carrier shifting mechanism 422 can enable use of the existing instance of the prefix generator mechanism 126 for generating the synchronization signal 128 for the direct-link communication 206.

The single carrier module 418 can use the first communication unit 316, the second communication unit 336, the first control unit 312, the second control unit 334, the communication unit or the control unit of the access node 106, or a combination thereof to generate the synchronization signal 128, such as including applying the phase ramp 143, processing in the time domain 146, the frequency domain 144, or a combination thereof. The single carrier module 418 can store the processing result, such as from applying the phase ramp 143, processing in the time domain 146, the frequency domain 144, or a combination thereof in the first communication unit 316, the second communication unit 336, the first storage unit 314, the second storage unit 346, the communication unit or the storage unit of the access node 106, or a combination thereof.

After generating the synchronization signal 128, the control flow can pass to the transmission module 406. The control flow can pass similarly as described above between the content identification module 402 and the format module 404, but using processing results of the format module 404, such as the synchronization signal 128.

The transmission module 406 is configured to communicate the serving content 110. The transmission module 406 can communicate the serving content 110 by sending or transmitting the serving signal 108, the synchronization signal 128, a portion therein, or a combination thereof.

The transmission module 406 can transmit the synchronization signal 128 or the serving signal 108 including the synchronization signal 128 for synchronizing the first user device 202, the second device 204, the access node 106, or a combination thereof for communicating the serving content 110. The transmission module 406 can transmit the synchronization signal 128 based on the single-carrier waveform 210, the OFDM waveform, or a combination thereof.

The transmission module 406 can transmit the synchronization signal 128 including the first synchronization symbol 134 and the second synchronization symbol 136 adjacent or abutting each other according to the synchronization adjacency structure 138. The transmission module 406 can further transmit the synchronization signal 128 including the prefix remainder 140 following the first synchronization symbol 134, the second synchronization symbol 136, or a combination thereof.

The transmission module 406 can transmit the synchronization signal 128 in the time domain 146. The transmission module 406 can transmit the synchronization signal 128 using the first inter-device interface 317, the second inter-device interface 337, the first communication unit 316, the second communication unit 336, the inter-device interface or the communication unit of the access node 106, or a combination thereof. The transmission module 406 can transmit based on applying, removing, fluctuating, or a combination thereof for energy, such as voltage, current, or power, according to a pattern, a frequency, a level, or a combination thereof corresponding to the synchronization signal 128.

Figure 5:
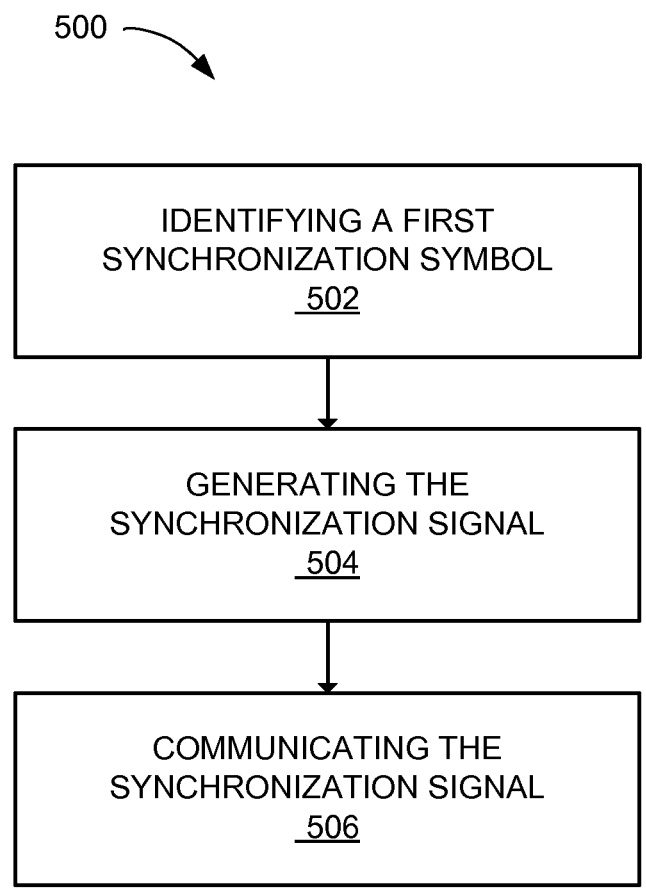
FIG. 5 is a flow chart of a method of operation of a computing system in a further embodiment.

Referring now to FIG. 5, therein is shown a flow chart 500 of a method of operation of a computing system in a further embodiment. The method 500 includes: identifying a first synchronization symbol and a second synchronization symbol corresponding to a synchronization signal in a block 502; generating with a communication unit the synchronization signal including the first synchronization symbol and the second synchronization symbol using a synchronization generator mechanism and a prefix generator mechanism in a block 504; and communicating the synchronization signal for synchronizing a first device and a second device for communicating a serving content in a block 506.

The modules described in this application can be hardware implementation or hardware accelerators, including passive circuitry, active circuitry, or both, in the first communication unit 316 of FIG. 3, the second communication unit 336 of FIG. 3, the first control unit 312 of FIG. 3, the second control unit 338 of FIG. 3, or a combination thereof. The modules can also be hardware implementation or hardware accelerators, including passive circuitry, active circuitry, or both, within the user electronic device 102 of FIG. 1, the access node 106 of FIG. 1, or a combination thereof but outside of the first communication unit 316, the second communication unit 336, the first control unit 312, the second control unit 334, or a combination thereof.

The computing system 100 of FIG. 1 has been described with module functions or order as an example. The computing system 100 can partition the modules differently or order the modules differently. For example, the general carrier module 416 of FIG. 4 and the single carrier module 418 of FIG. 4 can be combined. Also for example, the message generator module 412 of FIG. 4 and the message identification module 408 of FIG. 4 can be combined.

For illustrative purposes, the various modules have been described as being specific to the user electronic device 102, the access node 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 316, the second communication unit 336, the first storage unit 314, the second storage unit 346, or a combination thereof can represent the non-transitory computer readable medium. The first communication unit 316, the second communication unit 336, the first storage unit 314, the second storage unit 346, or a combination thereof, or a portion therein can be removable from the user electronic device 102, the access device 106, or a combination thereof. Examples of the non-transitory computer readable medium can be a non-volatile memory card or stick, an external hard disk drive, a tape cassette, or an optical disk.

The physical transformation of the message segments 112 of FIG. 1 and the information within results in the movement in the physical world, such as transmitting the synchronization signal 128 of FIG. 1 based on using the prefix generator mechanism 126 of FIG. 1. The synchronization signal 128 can further lead to other movements in the physical world, such as content displayed or recreated for the user on the first device 102 from processing the serving content 110 of FIG. 1 communicated based on the synchronization signal 128. The content reproduced on the first device 102, such as navigation information or voice signal of a caller, can influence the user's movement, such as following the navigation information or replying back to the caller. Movement in the physical world results in changes to the communication channel, the geographic location of the first device 102, or a combination thereof, which can be fed back into the computing system 100 and further influence the synchronization signal 128.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment described herein is that it valuably supports and services the historical trend of reducing costs, simplifying systems, and increasing performance.

These and other valuable aspects of an embodiment consequently further the state of the technology to at least the next level.

While the embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
    a communication unit including microelectronics and configured to:
        identify a first synchronization symbol and a second synchronization symbol corresponding to a synchronization signal,
        generate the synchronization signal including the first synchronization symbol and the second synchronization symbol using a synchronization generator mechanism and a prefix generator mechanism based on:
            constructing the second synchronization symbol;
            applying a half-tone shift to the second synchronization symbol for synchronizing a first device and a second device for communicating inter-device signal for direct-link communication; and
    an inter-device interface including a port, coupled to the communication unit, configured to communicate the synchronization signal for synchronizing the first device and the second device for communicating a serving content.

2. The system as claimed in claim 1 wherein the communication unit is configured to generate the synchronization signal based on processing the first synchronization symbol, the second synchronization symbol, or a combination thereof in frequency domain using the synchronization generator mechanism.

3. The system as claimed in claim 1 wherein the communication unit is configured to generate the synchronization signal based on processing the first synchronization symbol, the second synchronization symbol, or a combination thereof in time domain using the synchronization generator mechanism.

4. The system as claimed in claim 1 wherein the communication unit is configured to generate the synchronization signal based on applying a phase ramp to the first synchronization symbol, the second synchronization symbol, or a combination thereof.

5. The system as claimed in claim 1 wherein the communication unit is configured to generate the synchronization signal including the first synchronization symbol directly abutting the second synchronization symbol according to a synchronization adjacency structure.

6. The system as claimed in claim 5 wherein the communication unit is configured to generate the synchronization signal based on applying a phase ramp to the first synchronization symbol, the second synchronization symbol, or a combination thereof in frequency domain using the synchronization generator mechanism.

7. The system as claimed in claim 5 wherein the communication unit is configured to generate the synchronization signal based on applying a phase ramp to the first synchronization symbol, the second synchronization symbol, or a combination thereof in time domain using the synchronization generator mechanism.

8. The system as claimed in claim 5 wherein the communication unit is configured to generate the synchronization signal based on single-carrier waveform including the first synchronization symbol and the second synchronization symbol according to the synchronization adjacency structure using the prefix generator mechanism.

9. The system as claimed in claim 5 wherein the communication unit is configured to generate the synchronization signal including a prefix remainder following the first synchronization symbol and the second synchronization symbol.

10. A method of operation of a computing system comprising:
    identifying a first synchronization symbol and a second synchronization symbol corresponding to a synchronization signal;
    generating with a communication unit the synchronization signal including the first synchronization symbol and the second synchronization symbol using a synchronization generator mechanism and a prefix generator mechanism based on:
        constructing the second synchronization symbol;
        applying a half-tone shift to the second synchronization symbol for synchronizing a first device and a second device for communicating inter-device signal for direct-link communication; and
    communicating the synchronization signal for synchronizing a first device and the second device for communicating a serving content.

11. The method as claimed in claim 10 wherein generating the synchronization signal includes generating the synchronization signal based on processing the first synchronization symbol, the second synchronization symbol, or a combination thereof in frequency domain using the synchronization generator mechanism.

12. The method as claimed in claim 10 wherein generating the synchronization signal includes generating the synchronization signal based on processing the first synchronization symbol, the second synchronization symbol, or a combination thereof in time domain using the synchronization generator mechanism.

13. The method as claimed in claim 10 wherein generating the synchronization signal includes generating the synchronization signal based on applying a phase ramp to the first synchronization symbol, the second synchronization symbol, or a combination thereof.

14. A non-transitory computer readable medium including instructions, when executed by a computing system, allow the computing system to perform a method comprising:
   identifying a first synchronization symbol and a second synchronization symbol corresponding to a synchronization signal;
   generating the synchronization signal including the first synchronization symbol and the second synchronization symbol using a synchronization generator mechanism and a prefix generator mechanism based on:
      constructing the second synchronization symbol;
      applying a half-tone shift to the second synchronization symbol for synchronizing a first device and a second device for communicating inter-device signal for direct-link communication; and
      communicating the synchronization signal for synchronizing the first device and the second device for communicating a serving content.

15. The non-transitory computer readable medium as claimed in claim 14 wherein generating the synchronization signal includes generating the synchronization signal based on processing the first synchronization symbol, the second synchronization symbol, or a combination thereof in frequency domain using the synchronization generator mechanism.

16. The non-transitory computer readable medium as claimed in claim 14 wherein generating the synchronization signal includes generating the synchronization signal based on processing the first synchronization symbol, the second synchronization symbol, or a combination thereof in time domain using the synchronization generator mechanism.

17. The non-transitory computer readable medium as claimed in claim 14 wherein generating the synchronization signal includes generating the synchronization signal based on applying a phase ramp to the first synchronization symbol, the second synchronization symbol, or a combination thereof.

* * * * *